United States Patent
Cousins

(10) Patent No.: US 6,587,434 B1
(45) Date of Patent: Jul. 1, 2003

(54) TCP/IP COMMUNICATIONS PROTOCOL

(75) Inventor: Robert E. Cousins, Saratoga, CA (US)

(73) Assignee: Cirrus Logic, Inc, Austin, TX (US)

( * ) Notice: Subject to any disclaimer, the term of this patent is extended or adjusted under 35 U.S.C. 154(b) by 0 days.

(21) Appl. No.: 09/371,803

(22) Filed: Aug. 10, 1999

(51) Int. Cl.[7] .................................................. H04L 1/00
(52) U.S. Cl. ........................ 370/230; 370/231; 370/428
(58) Field of Search ................................. 370/229, 230, 370/231, 235, 401, 428, 412; 714/18, 748, 749

(56) References Cited

U.S. PATENT DOCUMENTS

| | | | |
|---|---|---|---|
| 4,726,027 A | * 2/1988 | Nakamura et al. | 714/748 |
| 5,425,026 A | 6/1995 | Mori | 370/60 |
| 5,553,083 A | * 9/1996 | Miller | 714/18 |
| 5,633,866 A | 5/1997 | Callon | 370/397 |
| 5,675,741 A | 10/1997 | Aggarwaal et al. | 395/200 |
| 5,737,526 A | 4/1998 | Periasamy et al. | 395/200 |
| 5,751,971 A | 5/1998 | Dobbins et al. | 395/200.68 |
| 5,754,547 A | 5/1998 | Nakazawa | 370/401 |
| 5,995,726 A | * 11/1999 | Dillon | 370/230 |
| 6,018,516 A | * 1/2000 | Packer | 370/428 |
| 6,021,516 A | * 2/2000 | Okajima et al. | 714/748 |
| 6,275,471 B1 | * 8/2001 | Bushmitch et al. | 370/230 |

OTHER PUBLICATIONS

Balakrishnan et al, Improving Reliable Transport and Hand-off Performance in Cellular Wireless Networks, ACM Wireless Networks, pp. 1–19, Dec. 1995.*

* cited by examiner

Primary Examiner—Seema S. Rao
Assistant Examiner—Frank Duong
(74) Attorney, Agent, or Firm—Robert P. Bell; Steven Lin; Steven Shaw

(57) ABSTRACT

The present invention includes an intelligent router and method for improving the routing of datagrams, resulting in increased effective bandwidth over networks of high latency. The intelligent router can be used alone or in combination with a second intelligent router. An intelligent router buffers data bound for a destination node within the router itself until the destination node has available space. In addition, the intelligent router of the present invention may continue to transmit a datagram without waiting for confirmation of receipt of a previous datagram. Also, retransmission requests can be ignored until a later time to accommodate for the delay in the network. When using multiple intelligent routers communicating with each other, only the erroneous portions of individual datagrams need to be resent. Routing between two intelligent routers eliminate or reduces the transmission of redundant data being sent.

35 Claims, 9 Drawing Sheets

|  | ROUTER1 | ROUTER2 | ROUTER3 |
|---|---|---|---|
| row1 | (888888888) | ( ) | (FULL) |
| row2 | (9988888) | (8888) | (FULL) |
| row3 | (9999) | (8888888888) | (PARTIALLY EMPTY) |
| row4 | (999999) | (8888) | (8888) |
| row5 | (99) | (9999) | (888888888 FULL) |

Figure 8

TCP/IP COMMUNICATIONS PROTOCOL

FIELD OF THE INVENTION

The present invention relates to the field of network communications, particularly communications using TCP/IP protocols and the like. Still more particularly, the present invention relates to an intelligent router capable of buffering datagrams.

BACKGROUND OF THE INVENTION

FIG. 1 illustrates a prior art communications circuit between two computers 110 and 120 through a computer network 130. Computer network 130 may include routers 140 and 150. Routers 140 and 150 may communicate with each other using one or more standardized protocols.

In prior art TCP/IP networks, first router 130 may not indicate to second router 140 that a certain amount of data storage space is available to store individual frames of data. Even if the router receiving information from a computer to be transmitted on the network has additional buffering space, the router may, in the prior art, receive only as much data at a time as space is available in the destination computer. Such a limitation on buffer size may unduly limit transmission speed over the network and increase latency.

Communications networks deliver data from a source node, typically a computer, to any number of destination nodes. Local Area Networks (LAN) are typically used for communications between nodes relatively close in proximity. LANs implement 48 bit addressing to identify the destination node.

However, due to bandwidth and transmission distance limitations, LANs are not used for coast-to-coast or even State-to-State communications. Wide Area Networks (WAN) are used for networking between computers or LANs located at a significant distance from each other. A LAN, due to close proximity of nodes, is much faster than a WAN with distant nodes.

WANs, such as the internet, use an addressing scheme known as an Internet Protocol (IP). Each node is assigned a unique IP address. Datagrams, also known as frames or packets of data, are sent with an IP header containing the IP address of the source node and, the IP address of the destination node.

A router receives the datagram, checks the IP destination node address and sends the datagram onto another router in an effort to reach the destination node.

Other protocols provide a second layer which rests on top of the IP. One such protocol is the User Datagram Protocol (UDP). Typically a UDP and data are packaged with an IP header which in turn is packaged with an ethernet header. UDP has a number of disadvantages. For example, UDP provides only one-way communication, no connection with the destination node, no verification of datagram receipt, and no error checking.

Another protocol layered on top of IP is the Transmission Control Protocol (TCP), which is the protocol of choice on the Internet. The TCP protocol, residing over the IP protocol (TCP/IP), provides a technique whereby data may be transferred from one node to another while insuring proper delivery of each datagram.

Using TCP/IP, each router may communicate with a counterpart router to indicate that data is to be sent from one router to another. Once a datagram has been transmitted, the source node awaits an acknowledgment from the destination node indicating the datagram has been received. If the datagram is not acknowledged as received within a certain time period (e.g., a timeout condition) the datagram may be resent.

TCP/IP has a number of advantages. For example, a two way connection may be established, the connection is continuous, datagram transmission is error-free, and the order of received datagrams is guaranteed to be correct. Data written to a TCP connection at the source node may be received at the destination node in the correct order and error free due to a sliding window effect of the buffer.

Sliding windows work as follows. In FIG. 1, source node 110 has data 160 waiting to be sent to final destination node 120. Source node 110 transmits datagrams (partial data 160) to a final destination node 120 having buffer 170. Datagrams are routed from source node 110 through LAN 190 to first router 140 over WAN 180 to second router 150 and through LAN 200 onto final destination node 120.

An acknowledgment is then transmitted back from final destination node 120 to source node 110, along acknowledgment path 130, after the datagrams has been received. An acknowledgment also reports the number of bytes destination node 120 has free in buffer 170.

As illustrated in FIG. 2, eventually final destination node 120 buffer 170 is full and acknowledgment, advertising a full buffer 170, is sent back to source node 110. Source node 110 ceases to transmit data 160 when buffer 170 is full.

FIG. 3 illustrates final destination node 120 eventually consuming data residing in buffer 170. Buffer 170 slides open, as would a window, and final destination node 120 advertises to source node 110 that buffer 170 has available space. Source node 110 resumes data 160 transmission. Buffer 170 size is a limitation that may unduly limit transmission speed over the network.

While TCP/IP insures that data may be transmitted in a timely fashion and error free, there are some disadvantages, particularly in high latency connections such as the internet. Since the TCP protocol is timeout based, a number of datagrams may be erroneously re-transmitted between nodes if a timeout conditions occurs due to latency of the network. If datagrams are erroneously resent, the latency of the network may be increased by the wasted bandwidth.

Errors in datagrams are corrected by requesting the entire datagram be retransmitted. Retransmitting entire datagrams results in redundant information being transmitted and causing additional latency. In addition, in a prior art TCP/IP protocol network, a router may await receipt of indication that a datagram is received before transmitting a next datagram. In a high latency network, such a technique may unduly slow down communications between nodes.

Also, on a network such as the internet data 160 is being requested sporadically and in bursts when users occasionally request another webpage. When buffer 170 is full data 160 is not sent until buffer 170 slides open. Final destination node 120 then notifies source node 110 that additional data 160 can now be sent. Data 160 may be traveling literally around the world, as shown in FIG. 4. Notification of available space from destination node 120 to source node 110 through WAN (internet) 180 takes a significant amount of time and user 2 sees an unacceptable delay in the loading of webpages.

Until the present invention, these needs and problems had not been met or solved.

SUMMARY OF THE INVENTION

The present invention is an intelligent router and method for improving the routing of datagrams, resulting in increased effective bandwidth over networks of high latency. Intelligent routers may be used alone or in combination with additional intelligent routers.

Re-transmission signals received due to a timeout condition may be ignored until a later time, to allow for delays in receiving datagrams due to high latency networks. Time delay between receiving a re-transmit request and honoring the request can be determined by computer network delays.

If a signal is later received by the intelligent router from the destination router indicating receipt of the datagram, the re-transmit request is ignored. If no such receipt signal is received, then the re-transmit request may be honored.

Datagrams may continue to be routed by the intelligent router without waiting for confirmation of receipt of a previous datagram. If a previous datagram is not received, such datagram may be re-transmitted in part or in whole.

In addition, the intelligent router may provide additional buffering for data to be transmitted over the network. Rather then receive only enough data to fill the buffer of the destination node, the intelligent router may buffer additional data within the router.

An intelligent router buffering data, as opposed to the destination node buffering data, is transparent to the source node sending data over the network.

In addition, when using two intelligent routers communicating with each other, only the erroneous portions of individual datagrams need to be resent. Routing between two intelligent routers eliminate or reduces transmission of redundant data.

BRIEF DESCRIPTIONS OF THE DRAWINGS

FIG. 8 is a table diagram illustrating the interaction of more than two intelligent routers.

DETAILED DESCRIPTION OF THE INVENTION

Figure 4:
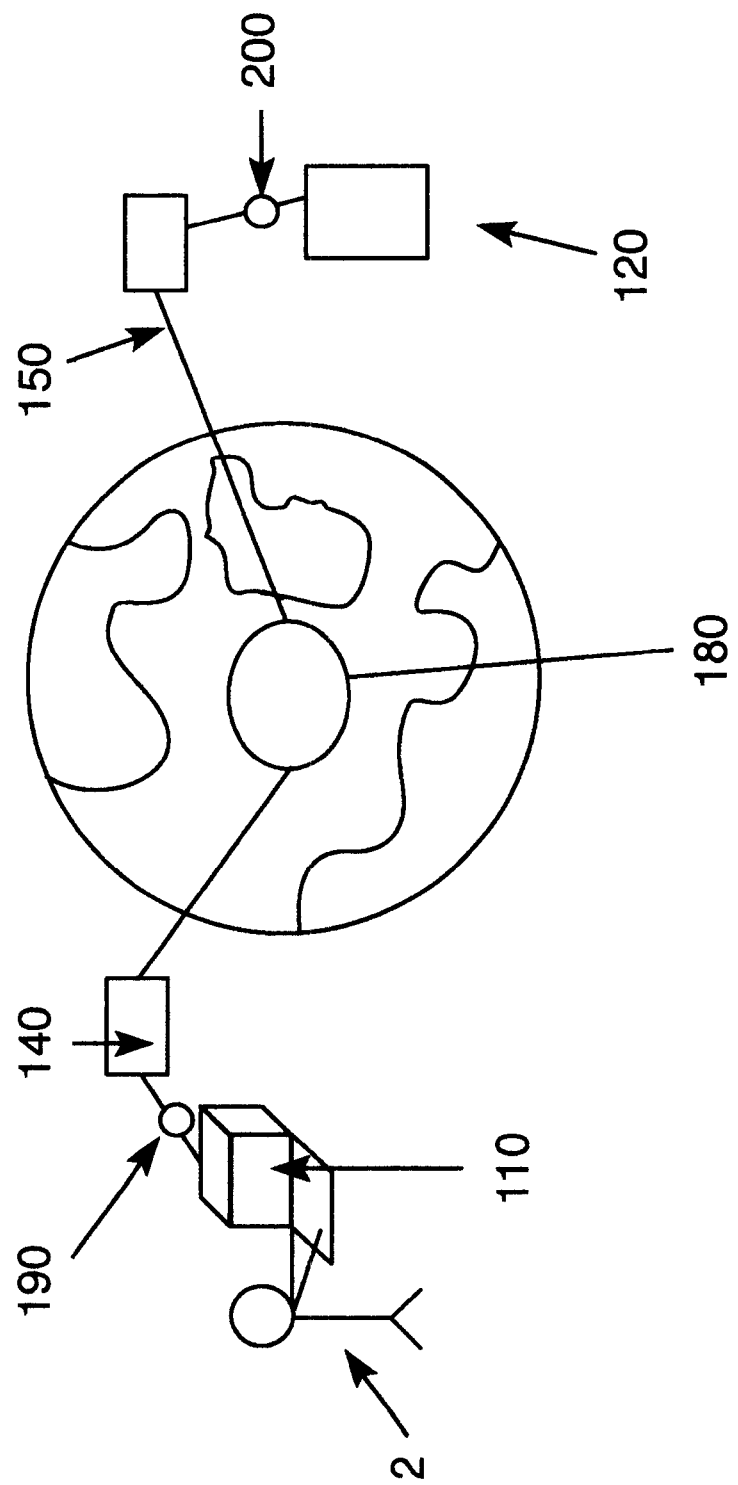
FIG. 4 is a diagram of a global network illustrating a user accessing data sent over the global network through routers.

FIG. 4 is a diagram of a global network illustrating user 2 accessing data sent over the global network through routers. User 2 may send data to destination node 120. Data may be sent from source node 110 through first LAN 190 routed through source router 140 over WAN (internet) 180 to destination router 150 through second LAN 200 onto destination node 120. In FIG. 4, LAN 190 and second LAN 200 transfer data from a node to a router much quicker than data can be routed over internet 180 due to the length of data travel and network traffic.

The preferred embodiment of the present invention described below in FIGS. 5 through 9 solves the latency problem inherent in transferring data over a WAN.

Figure 1:
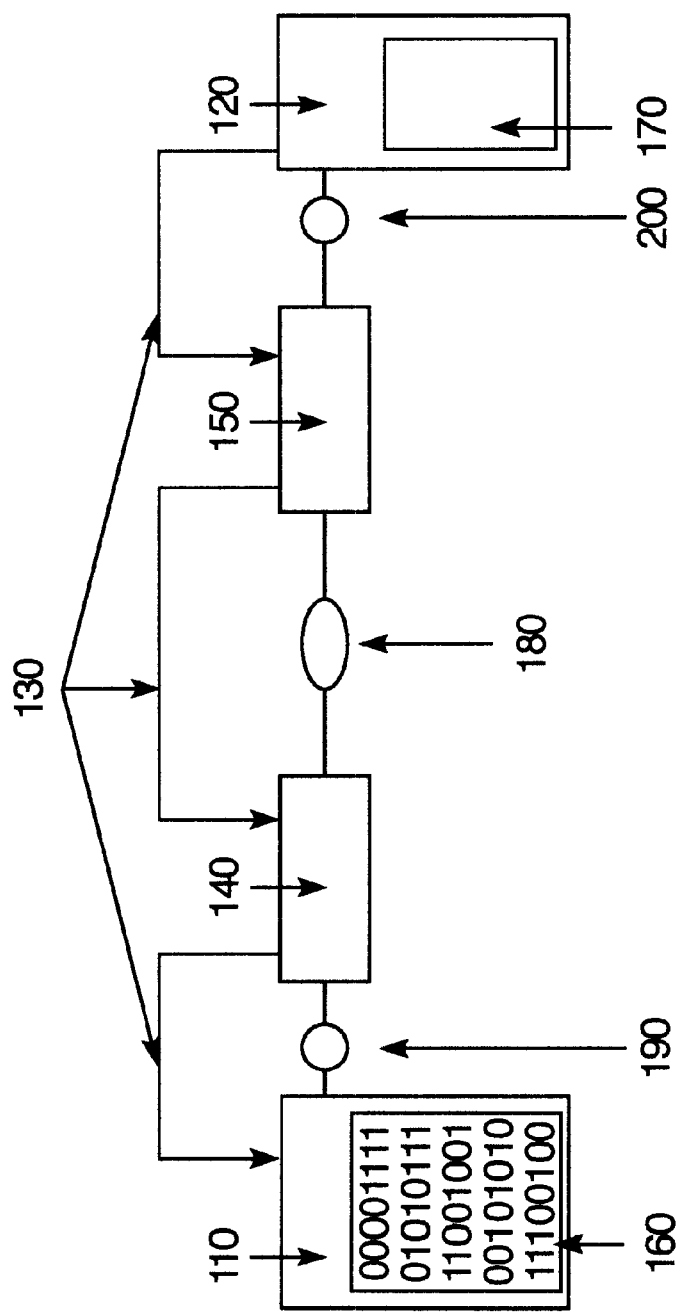
FIG. 1 is a block diagram of a prior art communications system illustrating datagram routing.
Figure 2:
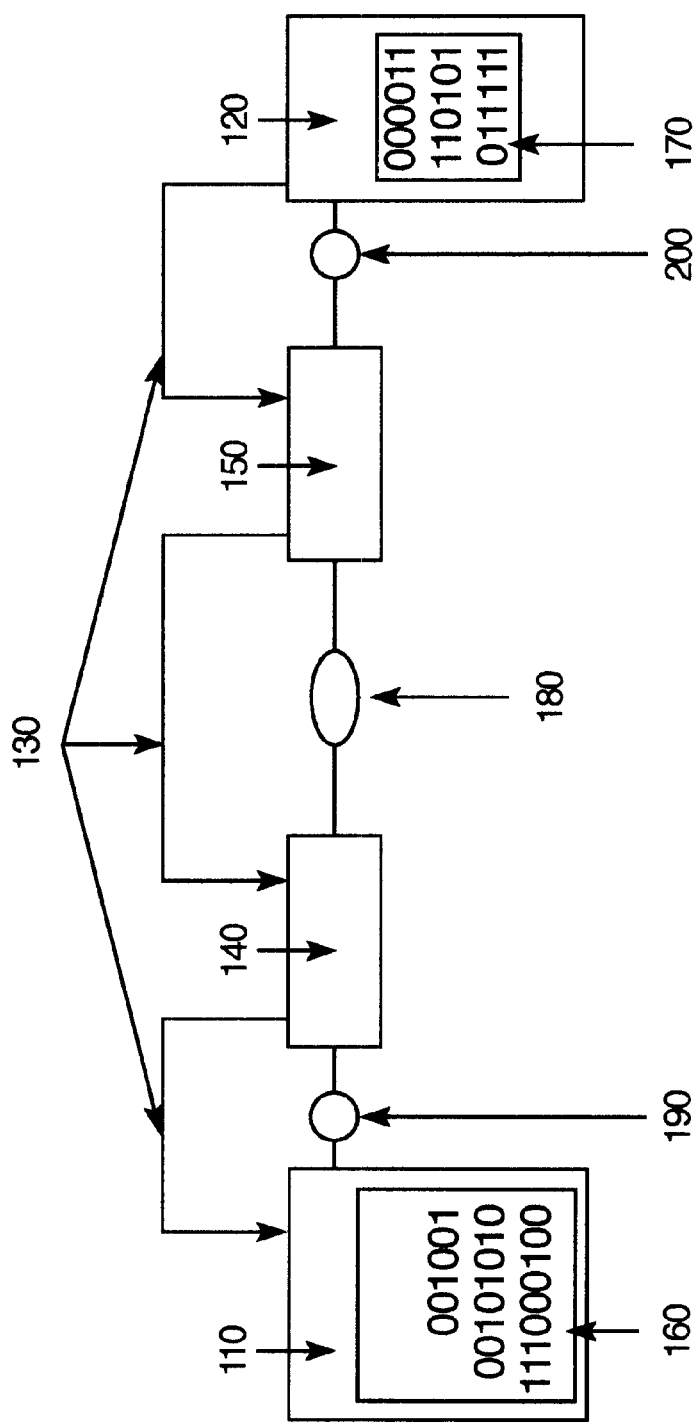
FIG. 2 is a block diagram of a prior art communications system illustrating the window effect of FIG. 1.
Figure 3:
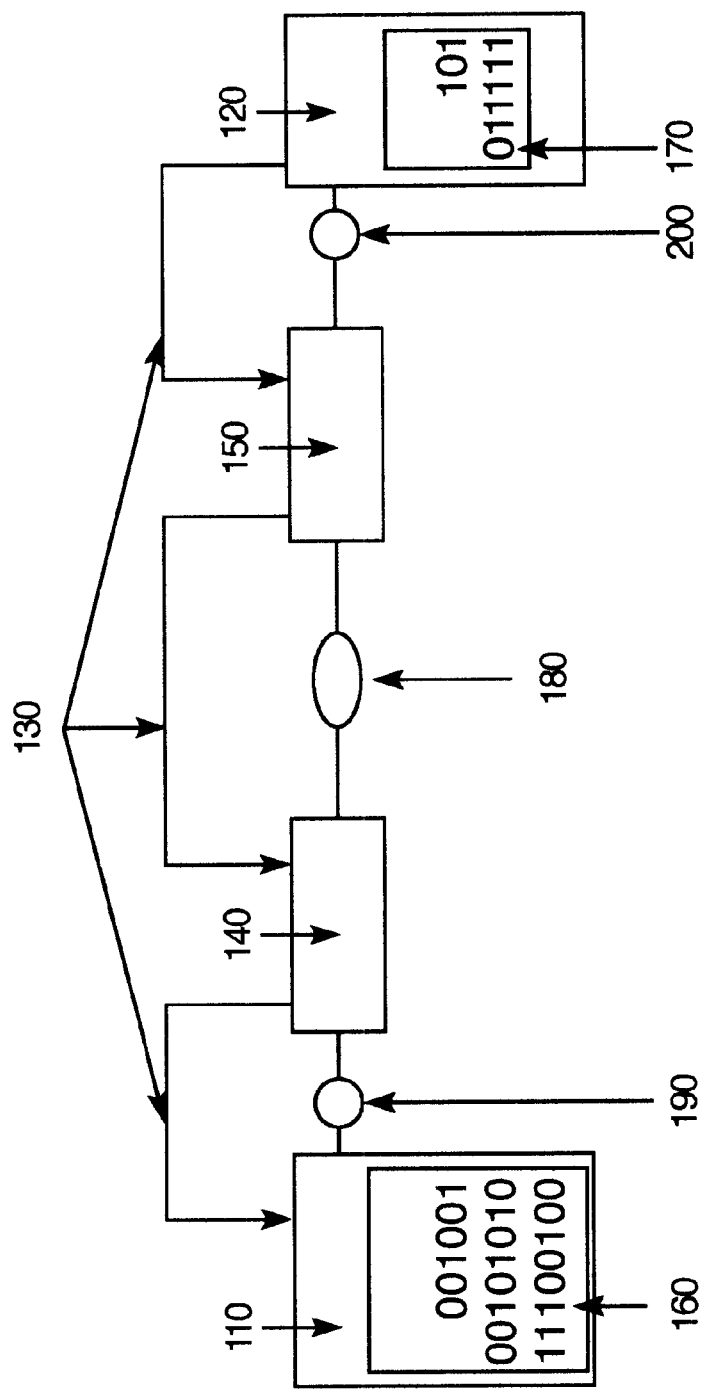
FIG. 3 is a block diagram of a prior art communications system illustrating a later stage of the window effect of FIG. 1 and FIG. 2.
Figure 5:
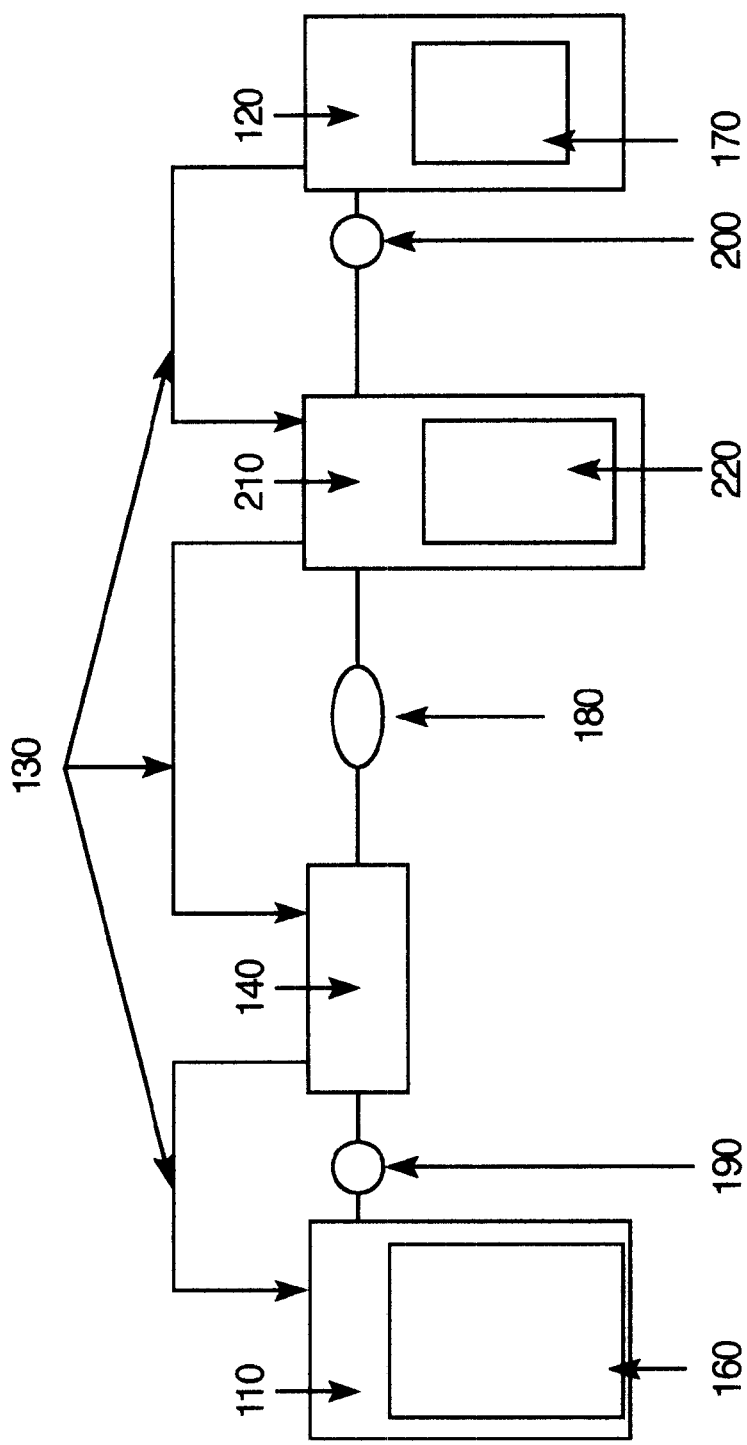
FIG. 5 is a block diagram illustrating an intelligent router of the present invention as destination router.

FIG. 5 is a block diagram similar to FIGS. 1, 2, and 3, however router 150 has been replaced with intelligent router 210. Intelligent router 210 has memory 220 for receiving and storing datagrams bound for destination node 120. Data 160 may be sent from source node 110 over first LAN 190 onto router 140. Router 140 checks the IP address of the datagram and forwards the datagram over internet 180 onto destination node 120.

Intelligent router 210 receives the datagram and takes one of two actions. If destination node memory buffer 170 has space, intelligent router 210 may transmit the datagram to destination node 120. If memory buffer 170 does not have space for the datagram, then intelligent router 210 may store the datagram in memory 220 until memory buffer 170 can receive the datagram.

Destination node 120 sends a notification back to source node 110 through path 130, stating whether additional space is available. Path 130 may comprises LAN 200, intelligent router 210, internet 180, router 140, and LAN 190.

If additional space is available source node 110 may continue to transmit datagrams, if space is not available source node 110 may cease to transmit datagrams.

However, intelligent router 210 may intercept the notification. If destination node 120 does not have space for additional data in memory buffer 170, and intelligent router 210 does have space, then intelligent router may modify the notification to fool source node 110 into believing space is available in destination node 120 memory buffer 170.

Source node 110 may continue to send datagrams which may be stored in memory 220. Intelligent router 210 may continue to send modified notifications to source node 110 that space is available until memory 220 is full. When memory 220 is full, intelligent router 210 may send notification to source node 110 that destination node 120 memory buffer 170 is full.

As space becomes available in memory 170, intelligent router 210 transmits datagrams from memory 220.

Intelligent router 210 modifies notifications in this manner since it takes a substantially longer period of time to send datagrams over internet 180 from source node 110 to destination node 120 then it takes to send datagrams from intelligent router 210 to destination node 120.

Intelligent router 210 buffers datagrams to reduce latency and remove the bottleneck created by internet 180.

Figure 6:
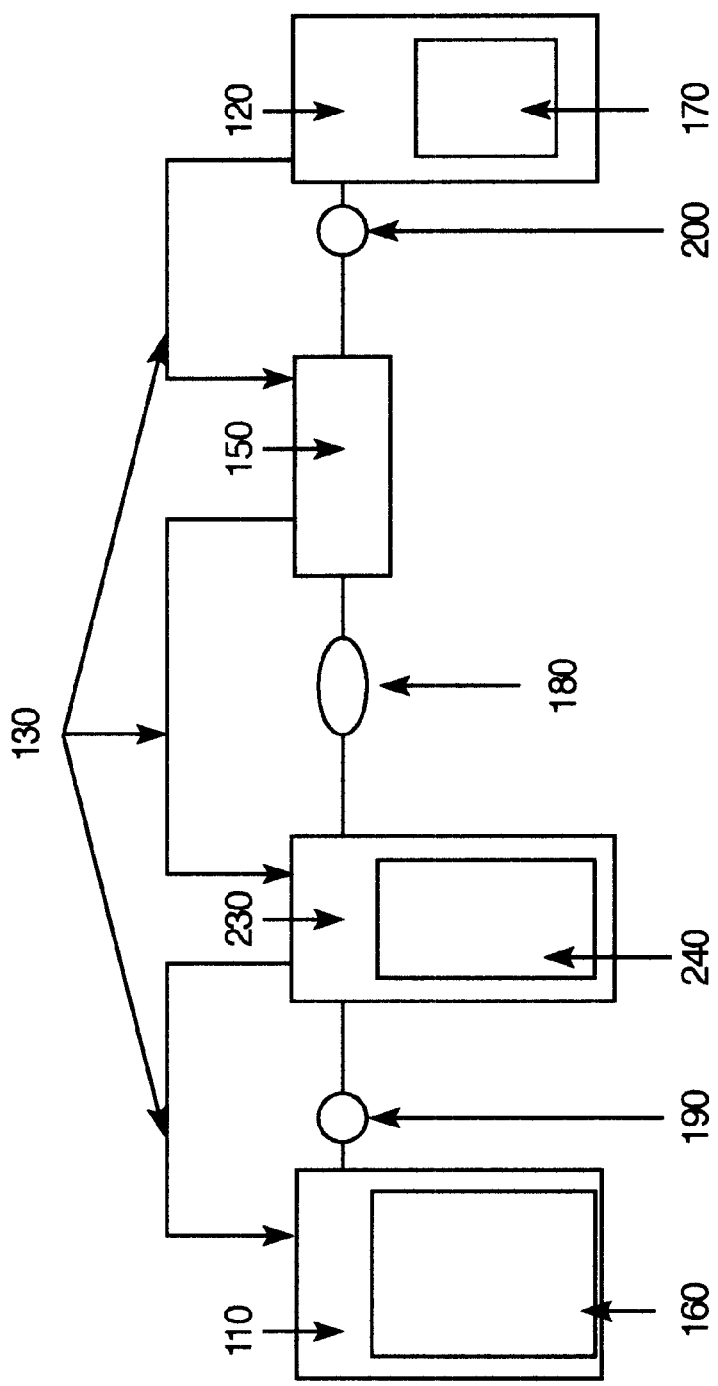
FIG. 6 is a block diagram illustrating an intelligent router of the present invention as source router.

FIG. 6 is a block diagram similar to FIG. 5, however, in the embodiment of FIG. 6, intelligent router 210 has been replaced with router 150 and router 140 has been replaced with intelligent router 230.

Intelligent router 230 buffers data in memory 240 from source node 110, using the same process intelligent router 210 used when buffering data from source node 110 in FIG. 5. Intelligent router 230 may decrease latency in multiple ways.

Destination router 150 may send a re-transmission notification to intelligent router 230. Re-transmission signals that are received due to a timeout condition may be ignored until a later time, to allow for delays in receiving the datagram due to the high latency network. The amount of time delay between receiving a re-transmit request and honoring the request can be determined by computer network delays.

When previous datagrams have been delayed by N number of seconds, then intelligent router 230 may delay re-transmission of the datagram until N number of seconds have passed. If while waiting N number of seconds to re-transmit, a notification, may be received indicating receipt of the datagram, then the re-transmission request may be ignored.

If notification of datagram receipt has not been received after N seconds, then intelligent router 230 may re-transmit the datagram.

Intelligent router 230 allows for delays due to network latency which in turn assists in decreasing network latency due to premature re-transmission of datagrams.

Intelligent router 230 also transmits datagrams before receiving notification that the previous datagram was received by destination, node 120. Intelligent router 230 determines the length of time X that it takes for destination node 120 to receive a datagram.

Intelligent router 230 may then send a notification to source node 110 acknowledging receipt of the datagram by destination node 120. Therefore, source node 110 may send additional datagrams.

The datagram may be stored in buffer memory 240 of intelligent router 230 until a receipt from destination node 120 may be received. Storing unacknowledged datagrams allows intelligent router 230 to re-transmit datagrams when an error has occurred and a re-transmit request has been received.

Datagrams may be forwarded by intelligent router every X seconds anticipating a notification of receipt by destination node 120. Intelligent router 230 may eliminate or reduce the latency inherent in waiting for a notification receipt before transmitting the next datagram.

Figure 7:
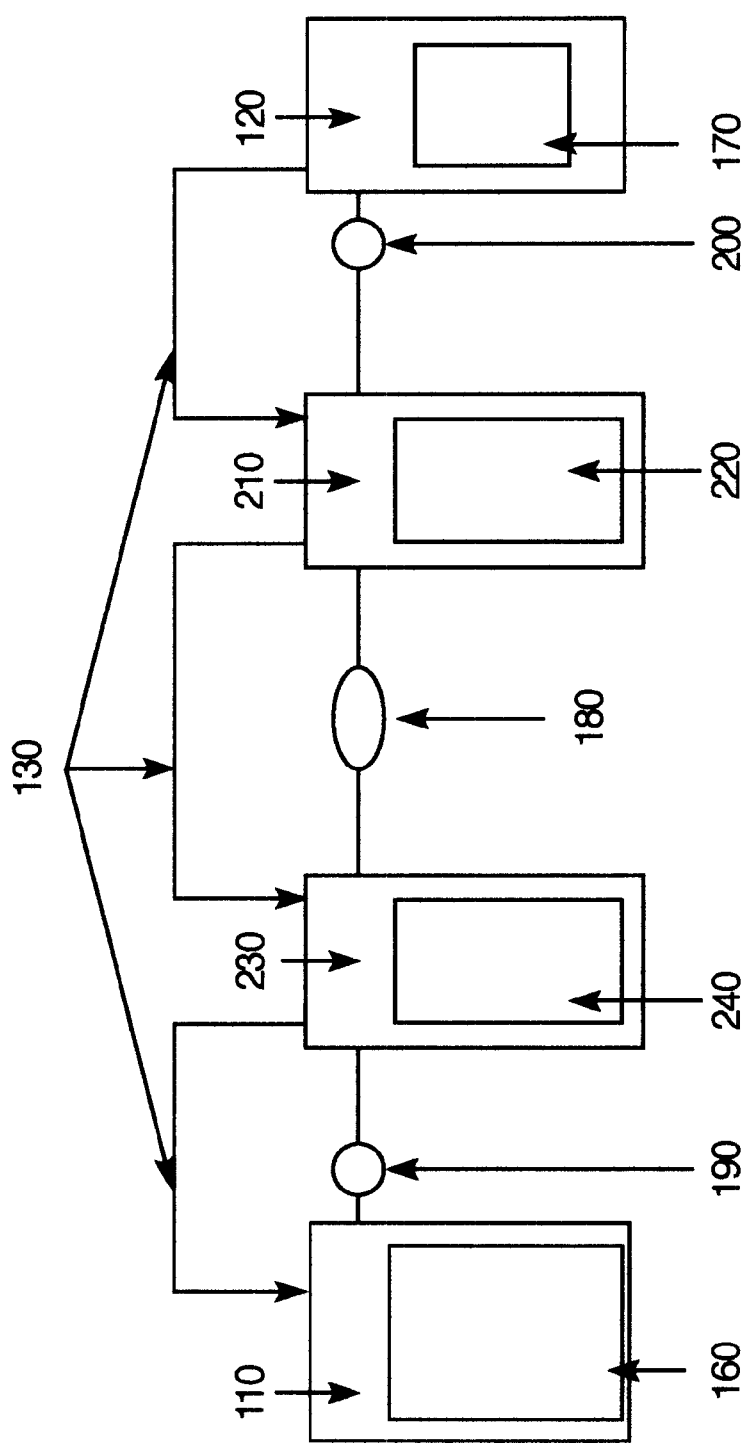
FIG. 7 is a block diagram illustrating two intelligent routers.

FIG. 7 illustrates an embodiment where two intelligent routers are communicating with each other, first intelligent router 230 and second intelligent router 210.

While first intelligent router 230 and second intelligent router 210 communicate with each other, only the erroneous portions of individual datagrams need to be resent. Routing between two intelligent routers eliminate or reduces transmission of redundant data being sent.

Second intelligent router 210 may parse through the datagram and determine an erroneous portion. An identifier for the erroneous portion of the datagram may be relayed back to first intelligent router 230. First intelligent router 230 may then parse through the original datagram stored in memory 240, extract the portion identified by second intelligent router 210 and retransmit the extracted portion to second intelligent router 210. Second intelligent router 210 may then repackage the retransmitted error free data appropriately within the originally received datagram.

Network latency may be reduced by re-transmitting only the erroneous part of the datagram as opposed to the entire datagram, the latter of which results in needless transmission of redundant data.

FIG. 8 is a table diagram illustrating interaction in an embodiment of more than two intelligent routers. Reading left to right, three columns are labeled ROUTER1, ROUTER2; and ROUTER3 respectively. Row one illustrates ROUTER1 with eight 8's, ROUTER2 is empty and ROUTER3 is shown as full. Intelligent routers work together to move all the data as close to the data destination as possible.

Even though ROUTER3 is full, row 2 illustrates that ROUTER2 has intercepted the full notification from ROUTER3 and told ROUTER1 to continue sending datagrams because space is available in ROUTER2. ROUTER2 stores the data, four 8's in row two until ROUTER3 has space. Row 3 illustrates that ROUTER2 now has all eight 8's and ROUTER1 has been continuously receiving data. ROUTER3 has sent data onward and is now partially empty.

Row 4 illustrates ROUTER2 transmitting data to ROUTER3. Row 5 illustrates that ROUTER2 filled ROUTER3 once again. ROUTER2 continues to receive data from ROUTER1.

The process illustrated in FIG. 4 allows data to move closer to the data destination even though the destination is full. Network latency may be decreased when the next closest router stores data waiting to forward it, as opposed to sending a message back to the source telling the source to cease data transmission until the destination has available space.

Figure 9:
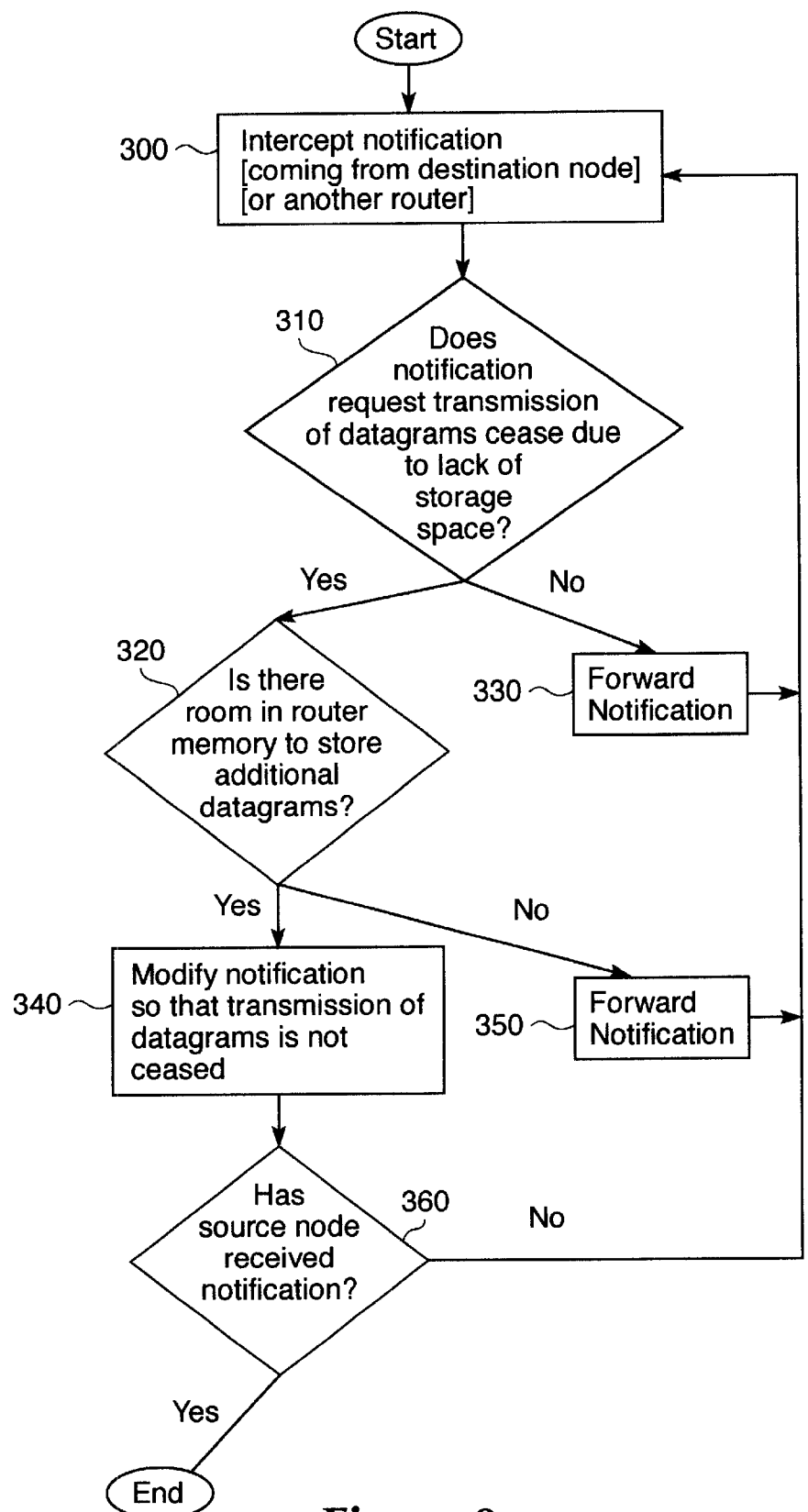
FIG. 9 is a flow chart illustrating the process of moving data ever so closer to the destination node when destination router is full.

FIG. 9 is a flow chart describing the process of moving data increasingly closer to the destination when the destination node may be full.

The process of FIG. 9 starts with step 300, in which an intelligent router intercepts a notification. In step 310 the intelligent router determines whether the destination node has run out of available space and is sending a notification to cease data transmission.

If destination node has run out of space for the data then the process passes to step 320, otherwise the process passes to step 100.

Step 330 simply forwards the notification unmodified onto the designated IP address because the destination node still has available space. The process passes back to step 300.

In Step 320 the intelligent router determines whether there is available space in the intelligent routers memory to store data. If space is available then the process passes to step 340 otherwise the process passes to step 350.

Step 350 simply forwards the notification unmodified onto the designated IP address because this intelligent router does not have available space to store data. The process passes back to step 300.

In step 340, the intelligent router modifies the notification sent by thee destination node. The notification may be forwarded and fools the source node into believing that space is available in the destination node so data transmission is not ceased. The intelligent router that modified the notification stores the data as it is received until it receives a notification to transmit data, additional storage is available.

Step 360 asks whether the notification has been received by the source node. If the source node has received the notification then the process ends.

If the source node has not received the notification then another router receives the notification and the process passes back to step 300.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A network router, comprising:
  a router means for routing datagrams, each datagram including a data portion and a header portion;
  a memory means for storing the datagrams;
  a datagram buffer program, residing within said router, for receiving and storing datagrams within said memory means for later transfer to a destination indicated in the header portion of each datagram;

a partial receive program, residing within said router, comprising:

means for determining if original received datagram has erroneous data;

means for determining which section of original received datagram has erroneous data;

means for transmitting a request to retransmit only the portion of the datagram that was deemed erroneous in the original received datagram;

means for receiving retransmission of requested data; and means for combining an error free portion of original received datagram with requested retransmitted data.

2. The network router of claim 1, further comprising:

a datagram notification interception proclaim, residing within said router, comprising:

means for receiving a notification packet including a message portion and a header portion;

means for modifying the message portion of the notification packet to reflect available space within said memory means; and means for routing the notification packet to the destination as indicted in the header portion of the notification.

3. The network router of claim 1, further comprising:

a delayed transmission program, residing within said router, comprising:

means for receiving a retransmission request for a datagram; and means for delaying retransmission of the datagram until a later time.

4. The network router of claim 3, wherein said delayed transmission program comprises:

means for storing elapsed time between a datagram time of transmission and datagram time of acknowledgment receipt;

means for averaging stored elapsed times to produce a calculated length of network delay; and means for retransmitting a,datagram after waiting the calculated length of the network delay.

5. The network router of claim 1, further comprising:

a nonconfirmation program, residing within said router, comprising means for routing next available datagram before receiving a notification that the previously routed datagram has been received.

6. The network router of claim 5, wherein said nonconfirmation program further comprises:

means for storing datagrams which have been routed before notification of receipt has been received, for later transmission if a retransmission request is received; and means for deleting datagrams for which a notification of receipt has been received.

7. A network router, comprising:

a router means for routing datagrams to another router, each datagram including a data portion and a header portion;

a memory means for storing the datagrams;

a datagram buffer program, residing within said router, for receiving and storing datagrams within said memory means for later transfer to a destination indicated in the header portion of each datagram; and a datagram notification interception program, residing within said router, comprising:

means for receiving a notification packet including a message portion and a header portion;

means for modifying the message portion of the notification packet to reflect available space within said memory means of the router; and means for routing the notification packet to a destination as indicted in the header portion of the notification.

8. A network router, comprising:

a router means for routing datagrams, each datagram including a data portion and a header portion;

a memory means for storing the datagrams;

a datagram buffer program, residing within said router, for receiving and storing datagrams within said memory means for later transfer to a destination indicated in the header portion of each datagram;

a partial retransmission program, residing within said router, comprising:

means for receiving request to retransmit a portion of a datagram;

means for removing requested portion of requested datagram, and means for retransmitting requested portion of requested datagram.

9. The network router of claim 8, further comprising:

a datagram notification interception program, residing within said router, comprising:

means for receiving a notification packet including a message portion and a header portion;

means for modifying the message portion of the notification packet to reflect available space within said memory means; and means for routing the notification packet to the destination as indicted in the header portion of the notification.

10. The network router of claim 8, further comprising:

a delayed transmission program, residing within said router, comprising:

means for receiving a retransmission request for a datagram; and means for delaying retransmission of the datagram until a later time.

11. The network router of claim 10, wherein said delayed transmission program comprises:

means for storing elapsed time between a datagram time of transmission and datagram time of acknowledgment receipt;

means for averaging stored elapsed times to produce a calculated length of network delay; and means for retransmitting a datagram after waiting the calculated length of the network delay.

12. The network router of claim 8, further comprising:

a nonconfirmation program, residing within said router, comprising means for routing next available datagram before receiving a notification that the previously routed datagram has been received.

13. The network router of claim 12, wherein said nonconfirmation program further comprises:

means for storing datagrams which have been routed before notification of receipt has been received, for later transmission if a retransmission request is received; and means for deleting datagrams for which a notification of receipt has been received.

14. A method for routing datagrams, comprising the steps of:

receiving datagrams in a router coupled to a source node and a destination node through a network, storing datagrams within the router, for transfer at a later time, if the destination node cannot receive additional datagrams, receiving notification that destination node has available space for storing datagrams, and transmitting stored datagram toward the destination node.

15. A method for routing datagrams, comprising the steps of:

receiving datagrams in a router coupled to a source node and a destination node through a network, storing datagrams within the router, for transfer at a later time, if the destination node cannot receive additional datagrams, intercepting a notification from the destination which is bound for source node;

determining if notification is requesting source transmission of datagrams to be ceased due to lack of space in the destination node in which to store additional datagrams, manipulating notification packet to produce a manipulated notification packet indicating to the source node that space is available in the destination node, thereby causing the source node to continue transmission, and storing, in the router, datagrams transmitted from the source node in response to the manipulated notification packet until the destination node has available space.

16. The method for routing datagrams of claim 15, further comprising the steps of:

receiving notification that destination node has available space for storing datagrams, and transmitting stored datagram toward the destination node.

17. The method for routing datagrams of claim 15, further comprising the steps of:

receiving a request to retransmit a datagram, and ignoring request to retransmit the datagram until a later time.

18. The method for routing datagrams of claim 17, further comprising the steps of:

receiving acknowledgment that datagram was received, and discarding previously ignored request to retransmit datagrams.

19. The method for routing datagrams of claim 17, wherein said step of ignoring a request to retransmit the datagram until a later time further comprises the steps of:

storing elapsed time between previous datagrams time of transmission and time of acknowledgement receipt;

averaging previous datagrams elapsed times to generate a calculated length of network delay, and retransmitting datagram after waiting the calculated length of the network delay.

20. The method for routing datagrams of claim 15, further comprising the step of:

routing next available datagram before receiving a notification that the previously routed datagram has been received.

21. The method for routing datagrams of claim 20, further comprising the steps of:

storing datagrams which have been routed before notification of receipt has been received, for later transmission if a retransmission request is received, and deleting datagrams for which a notification of receipt has been received.

22. A method for routing datagrams, comprising the steps of:

receiving datagrams in a router coupled to a source node and a destination node through a network, storing datagrams within the router, for transfer at a later time, if the destination node cannot receive additional datagrams, determining if original received datagram has erroneous data;

determining which section of original received datagram has erroneous data;

transmitting a request to retransmit only the portion of the datagram that was deemed erroneous in the original received datagram;

receiving retransmission of requested data, and combining error free portion of original received datagram with requested retransmitted data.

23. The method for routing datagrams of claim 22, further comprising the steps of:

receiving notification that destination node has available space for storing datagrams; and, transmitting stored datagram toward the destination node.

24. The method for routing datagrams of claim 22, further comprising the steps of:

receiving a request to retransmit a datagram, and ignoring request to retransmit the datagram until a later time.

25. The method for routing datagrams of claim 24, further comprising the steps of:

receiving acknowledgment that datagram was received, and discarding previously ignored request to retransmit datagrams.

26. The method for routing datagrams of claim 24, wherein said step of ignoring a request to retransmit the datagram until a later time further comprises the steps of:

storing elapsed time between previous datagrams time of transmission and time of acknowledgement receipt;

averaging previous datagrams elapsed times to generate a calculated length of network delay, and retransmitting datagram after waiting the calculated length of the network delay.

27. The method for routing datagrams of claim 22, further comprising the step of:

routing next available datagram before receiving a notification that the previously routed datagram has been received.

28. The method for routing datagrams of claim 27, further comprising the steps of:

storing datagrams which have been routed before notification of receipt has been received, for later transmission if a retransmission request is received, and deleting datagrams for which a notification of receipt has been received.

29. A method for routing datagrams, comprising the steps of:

receiving datagrams in a router coupled to a source node and a destination node through a network, storing datagrams within the router, for transfer at a later time, if the destination node cannot receive additional datagrams, receiving request to retransmit a portion of a datagram;

removing requested portion of requested datagram, and retransmitting requested portion of requested datagram.

30. The method for routing datagrams of claim 29, further comprising the step of:

routing next available datagram before receiving a notification that the previously routed datagram has been received.

31. The method for routing datagrams of claim 30, further comprising the steps of:

storing datagrams which have been routed before notification of receipt has been received, for later transmission if a retransmission request is received, and deleting datagrams for which a notification of receipt has been received.

32. The method for routing datagrams of claim 29, further comprising the steps of:

receiving notification that destination node has available space for storing datagrams, and transmitting stored datagram toward the destination node.

33. The method for routing datagrams of claim 29, further comprising the steps of:

receiving a request to retransmit a datagram, and ignoring request to retransmit the datagram until a later time.

34. The method for routing datagrams of claim 33, further comprising the steps of:

receiving acknowledgment that datagram was received, and discarding previously ignored request to retransmit datagrams.

35. The method for routing datagrams of claim 33, wherein said step of ignoring a request to-retransmit the datagram until a later time further comprises the steps of:

storing elapsed time between previous datagrams time of transmission and time of acknowledgement receipt;

averaging previous datagrams elapsed times to generate a calculated length of network delay, and retransmitting datagram after waiting the calculated length of the network delay.

* * * * *